Aug. 14, 1923.

R. G. GUPTILL 1,464,569

BEARING MATERIAL AND METHOD OF MAKING THE SAME

Filed April 14, 1922

Inventor
Rodney G. Guptill
By Marvis, Cameron, Lewis & Kirkham
Attorneys

Patented Aug. 14, 1923.

1,464,569

UNITED STATES PATENT OFFICE.

RODNEY G. GUPTILL, OF TULSA, OKLAHOMA, ASSIGNOR OF ONE-HALF TO ERNEST E. CORNELIUS AND ONE-TENTH TO WALTER M. McGEE, BOTH OF TULSA, OKLAHOMA.

BEARING MATERIAL AND METHOD OF MAKING THE SAME.

Application filed April 14, 1922. Serial No. 552,759.

*To all whom it may concern:*

Be it known that I, RODNEY G. GUPTILL, a citizen of the United States, residing at Tulsa, in the county of Tulsa and State of Oklahoma, have invented certain new and useful Improvements in a Bearing Material and Method of Making the Same; and I do hereby declare the following to be a full, clear, and exact description of the invention, such as will enable others skilled in the art to which it appertains to make and use the same.

This invention relates to a bearing material for use as the bearing surface in various types of bearings and to the method of making said material.

One object of the invention is to provide a simple, inexpensive and efficient bearing material which, when in use, will reduce friction to the minimum without the application of lubricants after installation. Another object is to provide an efficient and easily practiced method of making such bearing material. With these objects in view the invention, generally stated, consists in embedding any suitable form of lubricating carbon, in a finely divided state, in the surface of any suitable bearing metal while such metal is in a molten condition, and then permitting the molten bearing metal to cool, whereby the carbon is firmly bound in the surface of the metal. The bearing metal may be any suitable or known bearing metal such as lead hardened in any suitable or desired way, as by alloying the same with antimony, or antimony and zinc, or otherwise; and the carbon employed may be any form of carbon suitable for lubricating purposes. Amorphous carbon, such as graphite, has been found highly efficient, but any form of carbon which lubricates or reduces friction between surfaces is within the purview of the invention. The inventive idea involved in the bearing material itself may receive a variety of mechanical expressions or forms, and the method of making the same may vary somewhat in the detailed steps employed without departing from the broad principle of the invention, and, for the purpose of describing the invention, certain forms of the bearing material are described in detail, as well as specific steps for fabricating such forms, but it is to be expressly understood that the same are set forth merely for convenience of description, and are not designed to define the limits of the invention, reference being had to the appended claims for that purpose.

Figure 1:
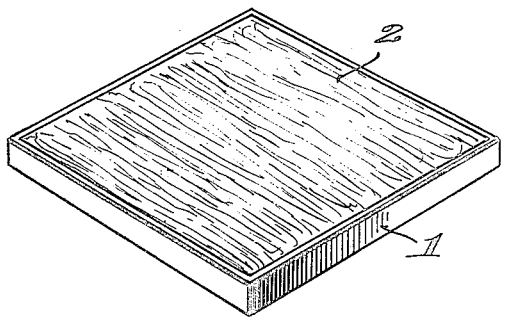
Figure 4:
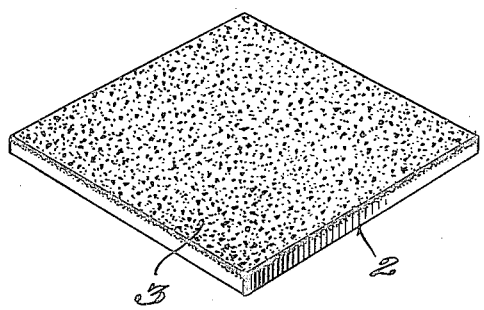
Figure 2:
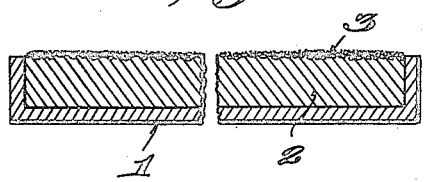
Figure 3:
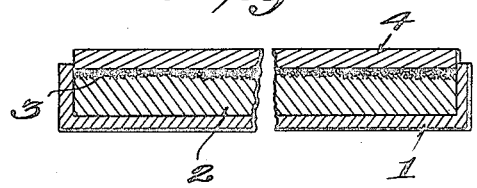

For a better understanding of the invention reference is had to the accompanying drawings, in which Fig. 1 is a plan view, partly in perspective of a vessel of molten bearing metal such as an alloy of lead, antimony and zinc, Fig. 2 is a like view of the molten metal with lubricating carbon in finely divided condition distributed over its surface, Fig. 3 is view of the same with a metal plate used to press the carbon into the surface of the molten metal and Fig. 4 is a view of the sheet of bearing material after it has cooled with the carbon embedded in its surface and firmly bound therein.

Figure 5:
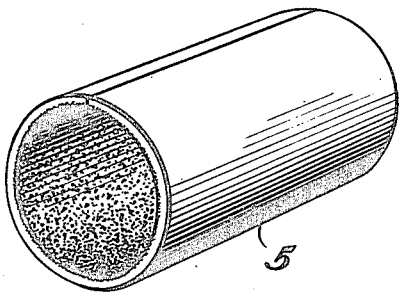

Fig. 5 is a perspective view of the plate shown in Fig. 4 bent to form a bearing.

Referring to Figs. 1 to 5, in which like reference numerals indicate like parts throughout the several views, 1 is a shallow vessel in which molten bearing metal, as an alloy of lead and antimony, or lead, antimony and zinc, or other suitably hardened bearing metal 2, has been poured. Over the surface of this molten metal there is then distributed a finely divided lubricating carbon. By the term "lubricating carbon" as here employed I mean carbon of such character and of such form as to reduce or minimize friction between surfaces. Amorphous carbon, such as graphite, has been found excellent for this purpose. For the purpose of uniformly distributing the carbon 3, over the surface of the molten metal 2, a sieve or other suitable device may be employed; the carbon may all be of a uniform degree of fineness, but preferably there is first distributed carbon in the form of somewhat fine grains, after which a much finer form of carbon is distributed. After the carbon is thus distributed over the surface of the molten metal, and while the latter is still in molten condition, a plate 4 is pressed down on the carbon forcing it into the molten surface. The plate 4, being of a temperature lower than the melting point of the bearing metal, serves to cool the latter and the carbon is thus held firmly bound in the surface of the metal as shown in Fig. 4. The latter is allowed to thoroughly cool, after which it may be bent into shape to form the bearing 5, Fig. 5.

The invention may be embodied in other forms, the basic principle of which is that the lubricating carbon in a finely divided state is embedded in the bearing metal while the metal is in a molten state.

Preferably, after the bearing material is formed as above described, it is heated to a temperature between 200 degrees and 400 degrees Fahrenheit and then immersed in a suitable oil, such as fish oil, also heated say to about 200 degrees Fahrenheit, for a period of time varying from 5 to 30 minutes. This greatly reduces any friction that is liable to occur on the initial use of the bearing. After a few hours run it will be found that further application of oil is unnecessary, that there is no abnormal heating of the parts, that friction is reduced to a minimum; no material wear of the parts being perceptible after a long and continuous use of the bearing.

The invention contemplates the use of any suitable basic bearing metal, such as lead, hardened to any desired degree by alloying or otherwise, and the use of any suitable form of lubricating carbon, in any suitable degree of fineness, the carbon being firmly bonded in the metal by flowing the latter around it when in a molten condition.

It will be understood that any suitable means may be employed for obtaining a proper distribution of the carbon over the surface of the bearing metal. For example, instead of first melting the metal and then distributing the carbon on the molten surface, the carbon may be distributed over the surface of a cold sheet of the bearing metal, after which the latter is melted and the carbon pressed therein; or the carbon may be distributed over a sheet of paper covered with a suitable binder and such sheet then placed upon the surface of the metal either before or after the latter is melted.

What is claimed is:—

1. A bearing material composed of a bearing metal having lubricating carbon in a finely divided state embedded in its surface.

2. A bearing material composed of an alloy of lead, zinc and antimony with lubricating carbon in a finely divided state embedded in its surface.

3. A bearing material comprising a basic, hardened bearing metal with lubricating carbon in a finely divided state embedded in its surface.

4. A bearing material comprising a bearing metal having lubricating carbon in a finely divided state embedded in its surface while such metal is in molten condition.

5. The method of making a bearing material which consists in surrounding lubricating carbon in a finely divided state with a bearing metal in molten condition and then permitting the metal to cool.

6. The method of making a bearing material which consists in melting a suitable bearing metal, distributing lubricating carbon over the molten surface, pressing the carbon into the molten surface and allowing the molten mass to cool.

7. The method of making a bearing material which consists in surrounding lubricating carbon in a finely divided state with a bearing metal in molten condition, and then immersing the same while at a temperature between 200 degrees and 400 degrees Fahrenheit, in a heated bath of a suitable oil.

8. The method of making a bearing material which consists in distributing lubricating carbon over the surface of a bearing metal and then forcing the carbon into said surface while the metal is in molten condition.

9. The method of making a bearing material which consists of melting a suitable bearing metal, distributing lubricating carbon over the molten surface, pressing the carbon into the molten surface, allowing the molten mass to solidify and saturating the carbon on the surface thereof with oil.

10. The method of making a bearing material which consists in distributing lubricating carbon in the form of fine grains over the surface of a bearing metal, distributing a much finer form of lubricating carbon over the surface of said metal, and then forcing the carbon into said surface while the metal is in molten condition.

In testimony whereof I affix my signature in presence of two witnesses.

RODNEY G. GUPTILL.

Witnesses:
S. T. CAMERON,
RAYMOND W. MAUTHE.